United States Patent [19]
Wong

[11] Patent Number: 5,568,227
[45] Date of Patent: Oct. 22, 1996

[54] METHOD AND APPARATUS FOR TRANSPORT SPEED OPTIMIZATION TO MINIMIZE IMAGE SMEAR

[75] Inventor: Lam F. Wong, Fairport, N.Y.

[73] Assignee: Xerox Corporation, Stamford, Conn.

[21] Appl. No.: 349,299

[22] Filed: Dec. 5, 1994

[51] Int. Cl.⁶ .................................................. G03G 21/00
[52] U.S. Cl. ............................................ 355/200; 355/311
[58] Field of Search ................................... 355/200, 203, 355/311

[56] References Cited

U.S. PATENT DOCUMENTS

| | | | |
|---|---|---|---|
| 4,017,065 | 4/1977 | Poehlein | 271/80 |
| 4,017,067 | 4/1977 | Soures et al. | 271/80 |
| 4,951,095 | 8/1990 | Warden | 355/273 |
| 5,160,946 | 11/1992 | Hwang | 346/157 |
| 5,166,735 | 11/1992 | Malachowski | 355/282 |
| 5,313,252 | 5/1994 | Castelli et al. | 355/203 |

*Primary Examiner*—Fred L. Braun
*Attorney, Agent, or Firm*—Kevin R. Kepner

[57] ABSTRACT

A method and apparatus for minimizing image smear. A plurality of sheets are printed, each having the same test pattern thereon but varying a sheet transport speed as each sheet is printed. The sheets are then scanned by the machine and a velocity profile for each sheet is created. The velocity profile is then used to determine a standard deviation and a mean velocity which are then calculated and stored or can be plotted for each sheet. The point at which the relationship between the standard deviation and the mean results in the lowest value is the optimum speed for the subsystem being calibrated. The test is then performed on a second subsystem and repeated several times so that the optimum speeds for the pre and post transfer drives are quickly and easily determined.

11 Claims, 3 Drawing Sheets

METHOD AND APPARATUS FOR TRANSPORT SPEED OPTIMIZATION TO MINIMIZE IMAGE SMEAR

This invention relates generally to schemes to correct image transfer smear in electrophotographic printing machines, and more particularly concerns a device and methods for optimizing transport speed to correlate with photoreceptor speed to minimize image smear due to speed mismatch.

In a typical electrophotographic printing process, a photoconductive member is charged to a substantially uniform potential so as to sensitize the surface thereof. The charged portion of the photoconductive member is exposed to a light image to selectively dissipate the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering electrostatically to carrier granules. The toner particles are attracted from the carrier granules to the latent image forming a toner powder image on the photoconductive member. The toner powder image is then transferred from the photoconductive member to a copy sheet by "tack" transfer: i.e., the copy sheet is attached to the photoreceptor with a sufficiently high force to overcome external forces that might otherwise tend to cause slip. The toner particles are heated to permanently affix the powder image to the copy sheet.

In a printing machine of the above mentioned configuration, when images are transferred from the photoreceptor to the image receiving substrate by slip transfer, any velocity mismatch will result in image smear and a consequential degradation in image quality. It is therefore essential that a sheet be delivered to and removed from the photoreceptor at as near the same velocity as the photoreceptor is moving to prevent the sheet from being moved relative to the photoreceptor during the transfer step.

The following disclosures may be relevant to various aspects of the present invention:

U.S. Pat. No. 5,313,252

Inventor: Castelli et al.

Issue Date: May 17, 1994

U.S. Pat. No. 5,166,735

Inventor: Malachowski

Issue Date: Nov. 24, 1992

U.S. Pat. No. 5,160,946

Inventor: Hwang

Issue Date: Nov. 3, 1992

U.S. Pat. No. 4,951,095

Inventor: Warden

Issue Date: Aug. 21, 1990

U.S. Pat. No. 4,017,067

Inventor: Soures, et al.

Issuer Date: Apr. 12, 1977

U.S. Pat. No. 4,017,065

Inventor: Poehlein

Issue Date: Apr. 12, 1977

The relevant portions of the foregoing disclosures may be briefly summarized as follows:

U.S. Pat. No. 5,313,252 to Castelli describes an apparatus and method for detecting and reducing image transfer smear. A pattern consisting of a sequence of toner characters or marks separated by spaces is written and developed on a photoreceptive member and then transferred to an intermediate medium. As the pattern is transferred to the intermediate medium, the velocity of the photoreceptor is varied. A photodetector is used to detect the transferred pattern on the intermediate medium and generate a signal indicative thereof. As the detector senses the absence of toner, the signal generated is greater when the space between the toner characters is largest. By monitoring when the signal is greatest and determining the corresponding velocity of the photoreceptor at that time, the best velocity match between the photoreceptor and intermediate transfer medium can be determined and set.

U.S. Pat. No. 5,166,735 to Malachowski discloses a sheet transport system incorporating a control for matching drive speeds imparted to a sheet extending between adjacent workstations. A copy sheet is engaged by a receiving surface disposed between the workstations and is adhered to the receiving surface by vacuum. The copy sheet follows a path offset from a linear path extending between the workstations. Fuser rolls are driven at a slightly higher speed to tension the copy sheet and lift it from the transport surface, the lifting is then detected by a sensor for sensing the vacuum in a plenum communicated with the receiving surface and the drive speed of the fuser rolls is controlled in accordance with the signal from the sensor.

U.S. Pat. No. 5,160,946 to Hwang discloses a registration system for an electrophotographic printing machine which forms registration indicia at a first transfer station and utilizes the formed indicia to register the image at subsequent transfer stations.

U.S. Pat. No. 4,951,095 to Warden discloses a xerographic copy machine having a circulating endless belt photoreceptor. A sheet is fed to the transfer region by a pair of coating rolls driven by a variable speed step motor. The rolls feed the leading portion of the copy sheet at approximately the same speed as the photoreceptor and when the copy sheet contacts the photoreceptor, the feed rolls are driven at a faster speed for a short interval to generate a buckle in a copy sheet just before the transfer region. The speed of the feed rolls is then returned to the initial value so that the buckle size remains constant while the remainder of the sheet is fed. The buckle provides sufficient surplus in the copy sheet to prevent it being pulled taught in the transfer region and thereby smearing the unfused toner image.

U.S. Pat. No. 4,017,067 to Soures, et al. describes an electrostatographic copier wherein the fuser rolls are positioned closer than the dimensions of the copy sheet from the image transfer area. Speed mismatch compensation between the fuser roll nip and the transfer region is provided by intentionally driving the fuser roll nip at a different preset velocity to form a buckle in the intermediate portion of the copy sheet, the buckle being controlled by selective cyclic reductions in the vacuum applied to a vacuum changer sheet guide surface between the fuser nip and the transfers area.

U.S. Pat. No. 4,017,065 to Poehlein describes an electrostatographic copier, wherein the fuser rolls are positioned closer than the dimensions of the copy sheet from the image transfer area. Speed mismatch compensation between the fuser roll nip and the image transfer area is provided by intentionally driving the fuser roll at a different velocity to form a buckle in the intermediate portion of the copy sheet, the buckle controlled by selective cyclic reductions in the vacuum applied to a configured manifold guide surface. The guide surface may be divided into segments through one of which the vacuum is continuously maintained.

In accordance with one aspect of the present invention, there is provided a method for optimizing the speed of a first sheet transport. The method comprises printing a test pattern on a plurality of sheets and varying the velocity of the sheet transport for each one of the plurality of printed sheets. The steps of determining a velocity profile for each one of the plurality of sheets and determining an optimized velocity for the sheet transport as a function of the velocity profile for each of the plurality of sheets are also provided.

Pursuant to another aspect of the present invention, there is provided a method for minimizing image transfer smear in a printing machine having a sheet transport. The method comprises printing having a test pattern on a plurality of sheets and varying the velocity of the sheet transport for each one of the plurality of printed sheets. The steps of determining a velocity profile for each one of the plurality of sheets and determining an optimized velocity for the sheet transport as a function of the velocity profile for each of the plurality of sheets are also provided.

Pursuant to yet another aspect of the present invention, there is provided an apparatus for minimizing image transfer smear in a printing machine. The apparatus comprises a photoreceptive member moving at a preselected velocity and a sheet transport adjacent said photoreceptive member for delivering a sheet to said photoreceptive member. A controller to control the velocity of said transport and a scanner operatively associated with said controller, for scanning a plurality of sheets and generating a signal indicative of a pattern printed on the plurality of sheets, said controller responsive to the signal, generating a velocity control signal for the transport are also provided.

Other features of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 3:
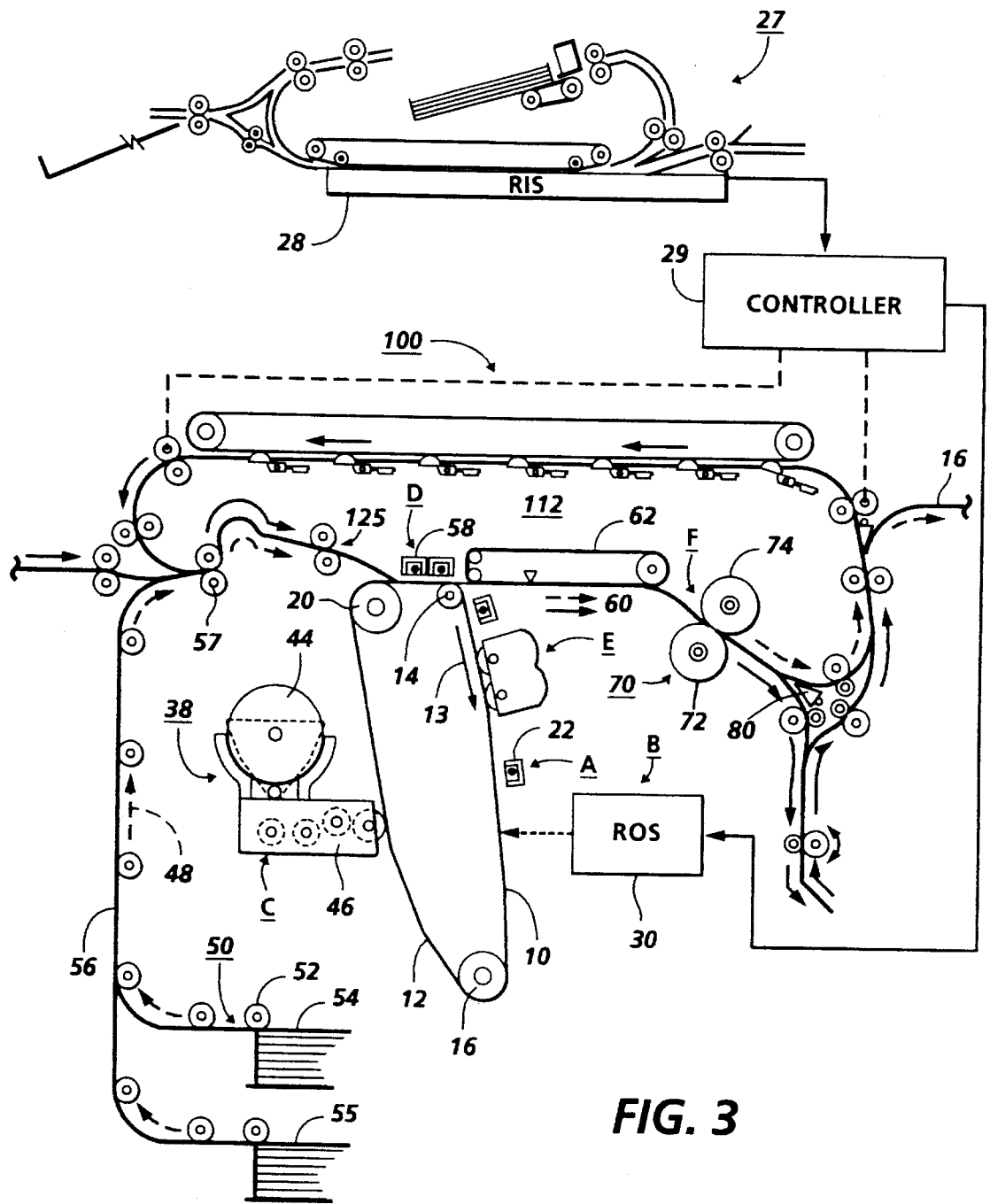
FIG. 3 is a schematic elevational view of an illustrative electrophotographic printing machine utilizing the method and apparatus of the present invention.

For a general understanding of the features of the present invention, reference is made to the drawings. In the drawings, like reference numerals have been used throughout to identify identical elements. FIG. 3 schematically depicts an electrophotographic printing machine incorporating the features of the present invention therein. It will become evident from the following discussion that the velocity optimization setpoint method and apparatus of the present invention may be employed in a wide variety of devices and is not specifically limited in its application to the particular embodiment depicted herein.

Referring to FIG. 3 of the drawings, an original document is positioned in a document handler 27 on a raster input scanner (RIS) indicated generally by reference numeral 28. The RIS contains document illumination lamps, optics, a mechanical scanning drive and a charge coupled device (CCD) array. The RIS captures the entire original document and converts it to a series of raster scan lines. This information is transmitted to an electronic subsystem (ESS) which controls a raster output scanner (ROS) described below.

FIG. 3 schematically illustrates an electrophotographic printing machine which generally employs a photoconductive belt 10. Preferably, the photoconductive belt 10 is made from a photoconductive material coated on a ground layer, which, in turn, is coated on an anti-curl backing layer. Belt 10 moves in the direction of arrow 13 to advance successive portions sequentially through the various processing stations disposed about the path of movement thereof. Belt 10 is entrained about stripping roller 14, tensioning roller 16 and drive roller 20. As roller 20 rotates, it advances belt 10 in the direction of arrow 13.

Initially, a portion of the photoconductive surface passes through charging station A. At charging station A, a corona generating device indicated generally by the reference numeral 22 charges the photoconductive belt 10 to a relatively high, substantially uniform potential.

At an exposure station, B, a controller or electronic subsystem (ESS), indicated generally by reference numeral 29, receives the image signals representing the desired output image and processes these signals to convert them to a continuous tone or greyscale rendition of the image which is transmitted to a modulated output generator, for example the raster output scanner (ROS), indicated generally by reference numeral 30. Preferably, ESS 29 is a self-contained, dedicated minicomputer. The image signals transmitted to ESS 29 may originate from a RIS as described above or from a computer, thereby enabling the electrophotographic printing machine to serve as a remotely located printer for one or more computers. Alternatively, the printer may serve as a dedicated printer for a high-speed computer. The signals from ESS 29, corresponding to the continuous tone image desired to be reproduced by the printing machine, are transmitted to ROS 30. ROS 30 includes a laser with rotating polygon mirror blocks. The ROS illuminates the charged portion of photoconductive belt 10 at a resolution of about 300 or more pixels per inch. The ROS will expose the photoconductive belt to record an electrostatic latent image thereon corresponding to the continuous tone image received from ESS 29. As an alternative, ROS 30 may employ a linear array of light emitting diodes (LEDs) arranged to illuminate the charged portion of photoconductive belt 10 on a raster-by-raster basis.

After the electrostatic latent image has been recorded on photoconductive surface 12, belt 10 advances the latent image to a development station, C, where toner, in the form of liquid or dry particles, is electrostatically attracted to the latent image using commonly known techniques. The latent image attracts toner particles from the carrier granules forming a toner powder image thereon. As successive electrostatic latent images are developed, toner particles are depleted from the developer material. A toner particle dispenser, indicated generally by the reference numeral 44, dispenses toner particles into developer housing 46 of developer unit 38.

With continued reference to FIG. 3, after the electrostatic latent image is developed, the toner powder image present on belt 10 advances to transfer station D. A print sheet 48 is advanced to the transfer station, D, by a sheet feeding apparatus, 50. Preferably, sheet feeding apparatus 50 includes a feed roll 52 contacting the uppermost sheet of stack 54. Feed roll 52 rotates to advance the uppermost sheet from stack 54 into vertical transport 56. Vertical transport 56 directs the advancing sheet 48 of support material into registration transport 57 past image transfer station D to receive an image from photoreceptor belt 10 in a timed sequence so that the toner powder image formed thereon contacts the advancing sheet 48 at transfer station D. Transfer station D includes a corona generating device 58 which sprays ions onto the back side of sheet 48. This attracts the toner powder image from photoconductive surface 12 to sheet 48. After transfer, sheet 48 continues to move in the direction of arrow 60 by way of a vacuum belt transport 62 which advances sheet 48 to fusing station F.

Fusing station F includes a fuser assembly indicated generally by the reference numeral 70 which permanently affixes the transferred toner powder image to the copy sheet. Preferably, fuser assembly 70 includes a heated fuser roller 72 and a pressure roller 74 with the powder image on the copy sheet contacting fuser roller 72. The pressure roller is cammed against the fuser roller to provide the necessary pressure to fix the toner powder image to the copy sheet. The fuser roll is internally heated by a quartz lamp (not shown). Release agent, stored in a reservoir (not shown), is pumped to a metering roll (not shown). A trim blade (not shown) trims off the excess release agent. The release agent transfers to a donor roll (not shown) and then to the fuser roll 72.

The sheet then passes through fuser 70 where the image is permanently fixed or fused to the sheet. After passing through fuser 70, a gate 80 either allows the sheet to move directly via output 16 to a finisher or stacker, or deflects the sheet into the duplex path 100,for recirculation back through transfer station D and fuser 70 for receiving and permanently fixing the side two image to the backside of that duplex sheet, before it exits via exit path 16.

After the print sheet is separated from photoconductive surface 12 of belt 10, the residual toner/developer and paper fiber particles adhering to photoconductive surface 12 are removed therefrom at cleaning station E. Cleaning station E includes a rotatably mounted fibrous brush in contact with photoconductive surface 12 to disturb and remove paper fibers and a cleaning blade to remove the nontransferred toner particles. The blade may be configured in either a wiper or doctor position depending on the application. Subsequent to cleaning, a discharge lamp (not shown) floods photoconductive surface 12 with light to dissipate any residual electrostatic charge remaining thereon prior to the charging thereof for the next successive imaging cycle.

The various machine functions are regulated by controller 29. The controller is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

It is believed that the foregoing description is sufficient for the purposes of the present application to illustrate the general operation of a printing machine.

Slip transfer is a term which indicates that relative motion may exist between the image carrier and the image recipient in the contact area within which transfer occurs. This usually implies that the mating elements (a photoreceptor, intermediate transfer medium, or a sheet) are independently driven. It is important that the independently driven subsystems particularly the pretransfer registration subsystem and the posttransfer transport system are accurately velocity matched with the photoreceptor to prevent the sheet from being dragged or pushed forward while in the transfer zone, thereby smearing the unfused toner image.

It is not trivial to determine the velocity set point for these subsystems in the paper path for the following reasons. First, the actual velocity of the hard copy substrate in the transport system can only be determined to at best within a one quarter of a percent accuracy. The exact velocity of the photoreceptor is also not exactly known because of the effective radius of the low lateral force rolls, the neutral axis of the belt bending around the roll, and the drag on the belt surface which could affect the outcome of the belt velocity. A second reason is simply the difficulty in selecting the appropriate velocity ratio for each paper path subsystem with respect to the photoreceptor. Accordingly, the invention herein describes the use of a semi-automatic procedure to measure the image motion noise power as a function of the velocity ratio between the paper path subsystem of interest and the photoreceptor. The velocity ratio point at which the image noise is the lowest will be used to determine the velocity set point of that subsystem.

Figure 1:
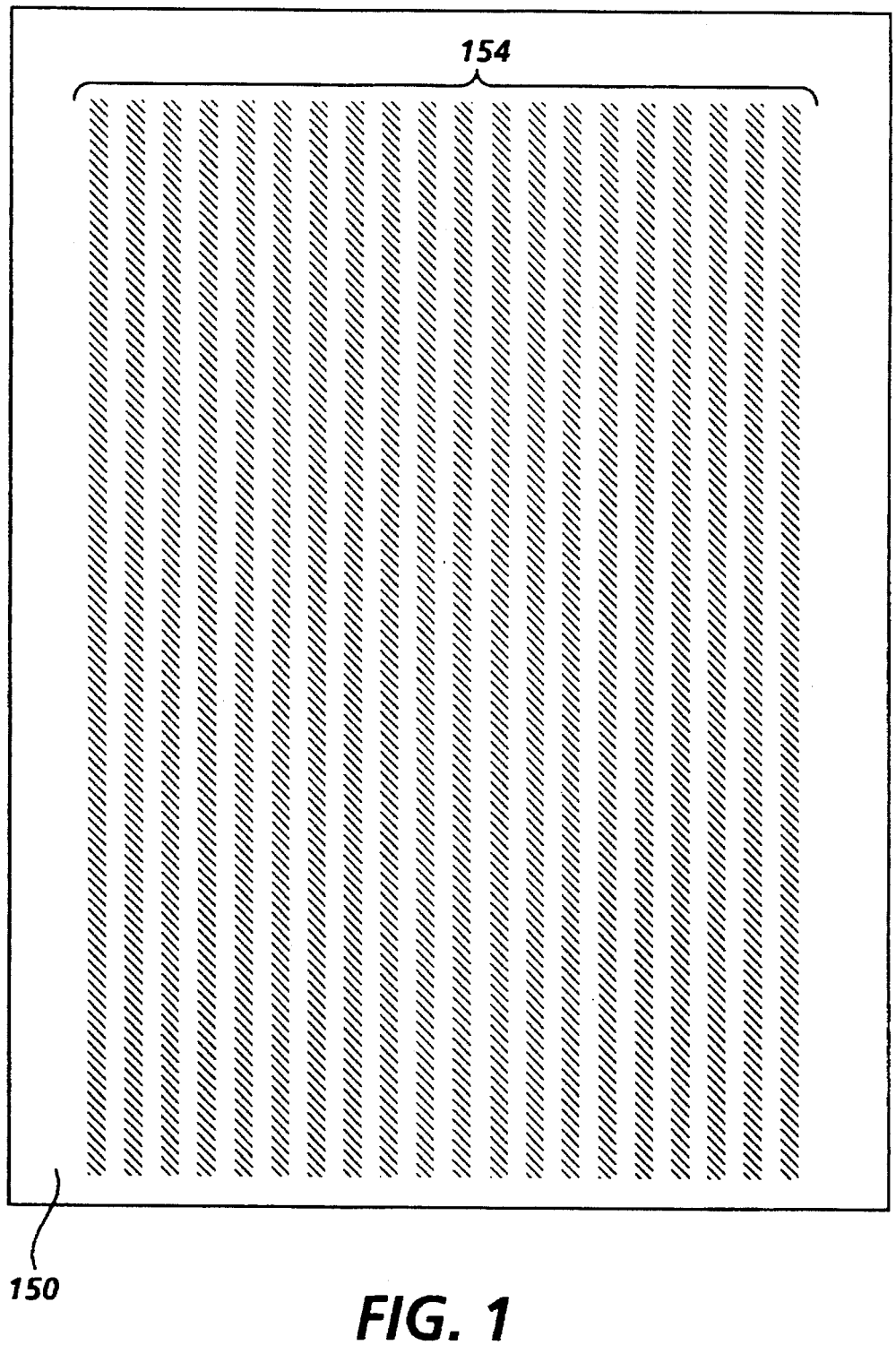
FIG. 1 is an illustration of the registration pattern to be imaged and transferred to a sheet for utilization with the method and apparatus described herein.
Figure 2:
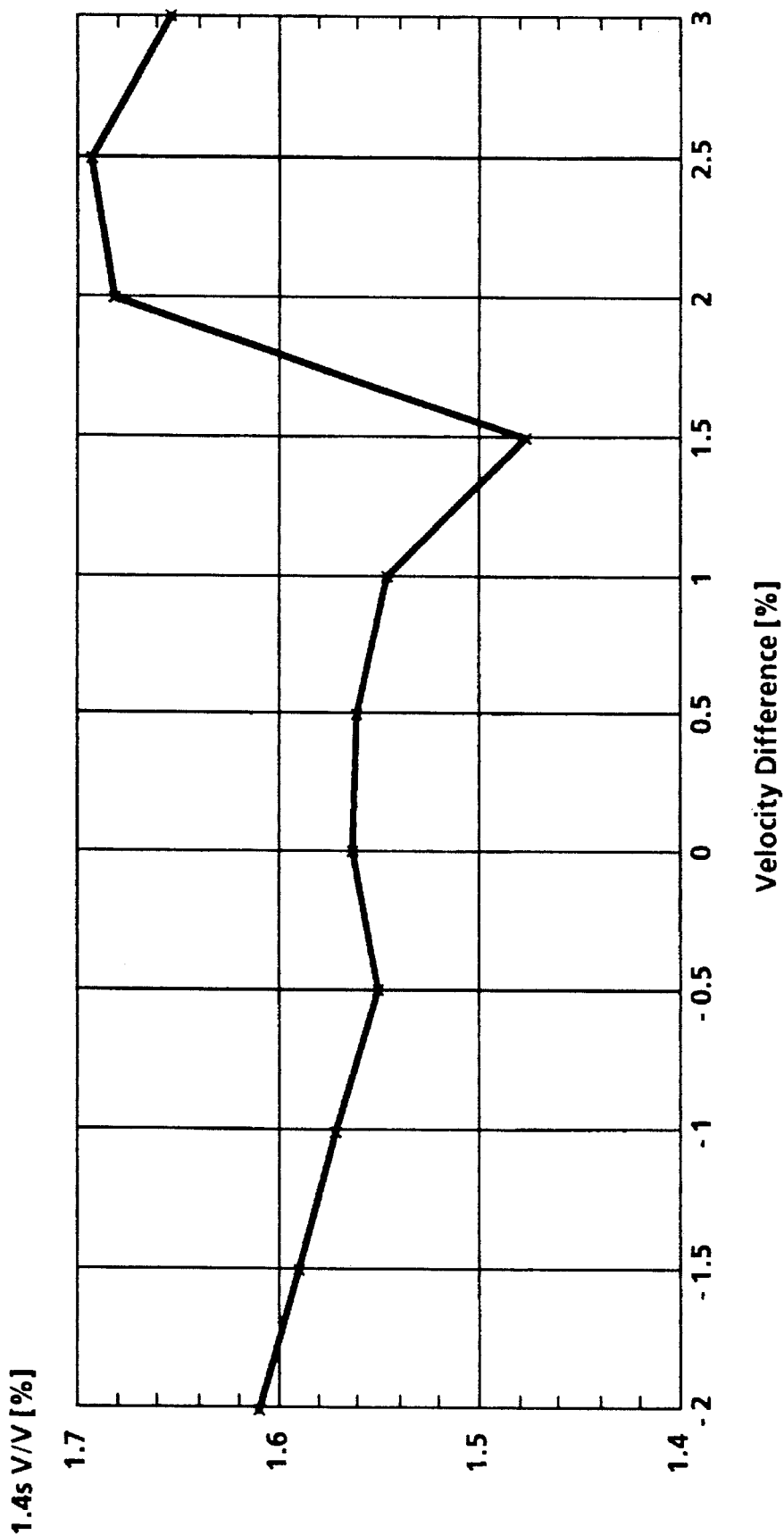
FIG. 2 is a graphical representation of the scaled standard deviation of the velocity with respect to the means of the velocity graphed as it relates to the velocity difference when performing the method of the invention herein.

Turning first to FIG. 1, there is illustrated a test pattern 154 which should be imaged on the photoreceptor developed with toner, and then transferred to a substrate 150. The image shown is a two pixel on, two pixel off ladder chart strip for a 600 spot per inch ROS on the full length of the paper in the slow scan direction, which chart is printed for a variety of velocities for the subsystem to be speed optimized. As an example, the FIG. 1 illustrated chart would be initially printed at a velocity intentionally set at a two percent slower speed for the post transfer transport than the photoreceptor. The same chart can then be printed on 10 more sheets of substrate with each chart varying in post transport velocity by 0.5 percent so that a total of 11 charts are created with a velocity range from −2 percent to +3 percent of the photoreceptor velocity. The 11 prints are then placed in the document handler of the digital copier and each chart is scanned with the scanner set at its highest resolution mode. The scanned information from each chart is then processed in the machine controller which computes the motion velocity profile in the form of a histogram for each of the 11 prints based on the centroid to centroid distance between the adjacent ladders. The standard deviation and mean of the velocity for each of the 11 prints is then computed. The ratio of one standard deviation with respect to the mean velocity is then calculated with respect to the velocity differential. This calculation is illustrated graphically in FIG. 2. As image smear increases, the level of standard deviation of the velocity as recorded in the ladder chart will increase. Thus, the velocity set point of the chart that has the lowest standard deviation with respect to the mean is then chosen as the optimal set point for the subsystem velocity to be tested. Of course other on/off patterns can be utilized to to construct the charts to perform the test as described above.

In the described example, once the optimum velocity set point for the post transfer transport is determined the same optimization test can then be run for the pretransfer registration transport. The test can then be repeated as each subsystem is optimized and after a series of three or four cycles, the optimum velocity set point for each subsystem quickly converges and the overall optimum velocity set points for each of the subsystems can be quickly determined.

The above-described velocity optimization setpoint method and apparatus provides an easy to use and quick routine for setting the optimum velocity setpoints for both the pretransfer registration transport and the post transfer prefuser transport to minimize image smear as a result of velocity differential between a sheet and the photoreceptor. The above-described test can be run whenever copy quality degrades as a result of the transport speeds varying as a function of roll wear, dirt in the system, a different type of paper being utilized, or any other environmental factor which can cause the velocities of the sheets being handled by the subsystems to vary over time.

In recapitulation, there is provided a method and apparatus for minimizing image smear. A plurality of sheets are printed, each having the same test pattern thereon but varying a sheet transport speed as each sheet is printed. The sheets are then scanned by the machine and a velocity profile for each sheet is created. The velocity profile is then used to determine a standard deviation and a mean velocity which are then calculated and stored or can be plotted for each sheet. The point at which the relationship between the standard deviation and the mean results in the lowest value is the optimum speed for the subsystem being calibrated. The test is then performed on a second subsystem and repeated several times so that the optimum speeds for the pre and post transfer drives are quickly and easily determined.

It is, therefore, apparent that there has been provided in accordance with the present invention, a velocity optimization setpoint method and apparatus that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method for optimizing the speed of a first sheet transport, comprising:

printing a test pattern on a plurality of sheets;

varying the velocity of the sheet transport for each one of the plurality of printed sheets;

determining a velocity profile for each one of the plurality of sheets; and determining an optimized velocity for the sheet transport as a function of the velocity profile for each of the plurality of sheets.

2. A method according to claim 1, further comprising incrementally varying the speed of a subsystem over a preselected range so that each of the plurality of sheets corresponds to a different incremental velocity for the selected subsystem.

3. A method according to claim 2, further comprising determining the standard deviation and velocity mean for each of the plurality of printed sheets as a function of the velocity profile of each of the sheets.

4. A method according to claim 3 wherein said velocity optimizated determining step comprises determining a velocity having a lowest ratio of standard deviation with respect to the mean velocity.

5. A method according to claim 4, further comprising setting the velocity of the sheet transport to the optimized velocity.

6. A method for minimizing image transfer smear in a printing machine having a sheet transport, comprising:

printing a test pattern on a plurality of sheets;

varying the velocity of the sheet transport for each one of the plurality of printed sheets;

determining a velocity profile for each one of the plurality of sheets; and determining an optimized velocity for the sheet transport as a function of the velocity profile for each of the plurality of sheets.

7. A method according to claim 6, further comprising incrementally varying the speed of a subsystem over a preselected range so that each of the plurality of sheets corresponds to a different incremental velocity for the sheet transport.

8. A method according to claim 7, further comprising determining the standard deviation and velocity mean for each of the plurality of sheets as a function of the velocity profile of each of the sheets.

9. A method according to claim 8 wherein said velocity setpoint optimized determining step comprises determining a velocity having a lowest ratio of standard deviation with respect to the mean velocity.

10. A method according to claim 9, further comprising setting the velocity of the first sheet transport to the optimized velocity.

11. An apparatus for minimizing image transfer smear in a printing machine, comprising:

a photoreceptive member moving at a preselected velocity;

a sheet transport adjacent said photoreceptive member for delivering a sheet to said photoreceptive member;

a controller to control the velocity of said transport; and a scanner operatively associated with said controller, for scanning a plurality of sheets and generating a signal indicative of a pattern printed on the plurality of sheets, said controller responsive to the signal, generating a velocity control signal for the transport.

* * * * *